United States Patent [19]
Ziegler

[11] Patent Number: 5,447,076
[45] Date of Patent: Sep. 5, 1995

[54] CAPACITIVE FORCE SENSOR

[76] Inventor: Karlheinz Ziegler, Alemannenstrasse 1, 7801 Schallstadt 2, Germany

[21] Appl. No.: 980,786
[22] PCT Filed: Aug. 21, 1991
[86] PCT No.: PCT/DE91/00671
 § 371 Date: Feb. 24, 1993
 § 102(e) Date: Feb. 24, 1993
[87] PCT Pub. No.: WO92/04608
 PCT Pub. Date: Mar. 19, 1992

[30] Foreign Application Priority Data
 Sep. 1, 1990 [DE] Germany ............ 40 27 753.4

[51] Int. Cl.⁶ ............................................ G01L 1/12
[52] U.S. Cl. ............................ 73/862.626; 73/862.625
[58] Field of Search ............... 73/862.92, 862.621, 73/862.625, 862.626, 862.68, 862.042, 862.046, 724

[56] References Cited
U.S. PATENT DOCUMENTS

| | | | |
|---|---|---|---|
| Re. 32,180 | 6/1986 | Lewiner et al. | 73/862.046 |
| 3,875,481 | 4/1975 | Miller et al. | 73/862.626 |
| 4,555,954 | 12/1985 | Kim | 73/862.046 |
| 4,562,742 | 1/1986 | Bell | 73/724 |
| 4,644,801 | 2/1987 | Kustanovich | 73/862.626 X |
| 4,986,136 | 1/1991 | Brunner et al. | 73/862.046 |
| 5,150,759 | 9/1992 | Borchard | 73/862.52 X |

FOREIGN PATENT DOCUMENTS 2800844 7/1978 Germany ............ 73/862.626

Primary Examiner—Richard E. Chilcot, Jr.
Assistant Examiner—Elizabeth L. Dougherty
Attorney, Agent, or Firm—Michael J. Hughes

[57] ABSTRACT

A capacitive force sensor is comprised of a base (1) containing a capacitance electrode (3), a cover (8) containing a second capacitance electrode (9) and spacers (7) separating these two components. The material thickness of the base (1) and the cover (8) is such that when a force is applied at least one of the materials constituting the base (1), the cover (8) and the spacers (7) will be compressed to such a degree that a decrease in the distance between the capacitance electrodes (3,9) will result but the materials bridging the areas between the spacers (7) will not be deformed.

17 Claims, 25 Drawing Sheets

CAPACITIVE FORCE SENSOR

TECHNICAL FIELD

This invention pertains to a force (or pressure) sensor comprised of a base containing a capacitance electrode, a cover containing a second capacitance electrode, and spacers separating these two components.

BACKGROUND ART

A capacitive force sensor is already described under DE 34 26 165 A1; this sensor measures forces by detecting a change in capacitance between the electrodes as the cover, which is designed as a membrane, is depressed.

Such existing force or pressure-sensing devices are not suited to measure large forces or high pressures because their membrane may be depressed to such a degree that it touches the opposite side. Also, specialized auxiliary equipment is required in order to transmit forces or pressures to the device. A further disadvantage results from the nonlinear relationship between capacitance and force or pressure set up in this type of device.

DISCLOSURE OF INVENTION

Improvements this invention offers over the aforementioned state-of-the-art devices include: A compact design, the capacity to accommodate very large forces and high pressures, and the establishment of a linear relationship between changes in capacitance and the force or pressure measured.

The invention achieves these improvements by choosing materials for the device's base and cover with sufficient thickness so that when a force is applied, the material of at least one these components will be compressed to such a degree that a decrease in the distance between the capacitance electrodes will result but the materials bridging the areas between the spacers are not deformed.

The spacers are distributed along the base and cover surfaces, which face each other. Their size (height or length) is very small relative to the thickness of the material comprising the base and the cover. Thus, a change in capacitance results almost exclusively from the compression of the base and/or cover material. The spacers can be constructed as many columns (each with a square cross section) arranged in a checkerboard pattern. The distance between these columns should be approximately the same as the length of their sides.

The spacers can also be constructed as U-shaped ridges on the surface of the base. Another possibility is to construct the spacers as ridges having cross sections in the shape of sections of a circle.

Further useful examples of the invention are described below and illustrated in the attached drawings.

BEST MODE FOR CARRYING OUT INVENTION

Figure 1:
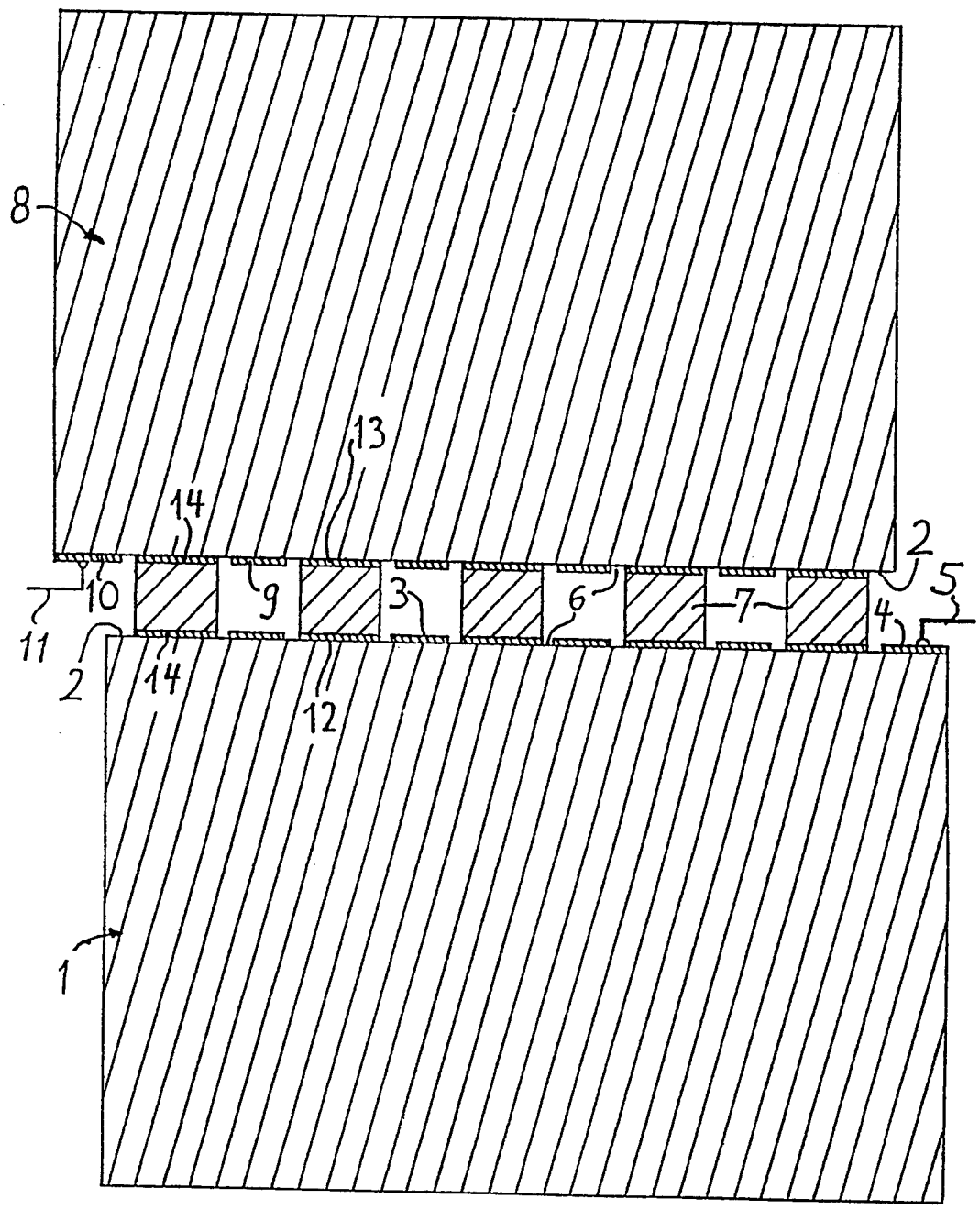
FIG. 1 A longitudinal section of the invented capacitive force sensor.

The first example of a force or pressure sensor is shown in FIG. 1 as a longitudinal section, which is not to scale. The force or pressure sensor, hereafter referred to simply as force sensor, comprises a base 1, overlain by the base's capacitance electrode 3 on the base's inner surface 2. This electrode is electrically connected, via surface 4, with the first sensor connector lead 5.

Figure 2:
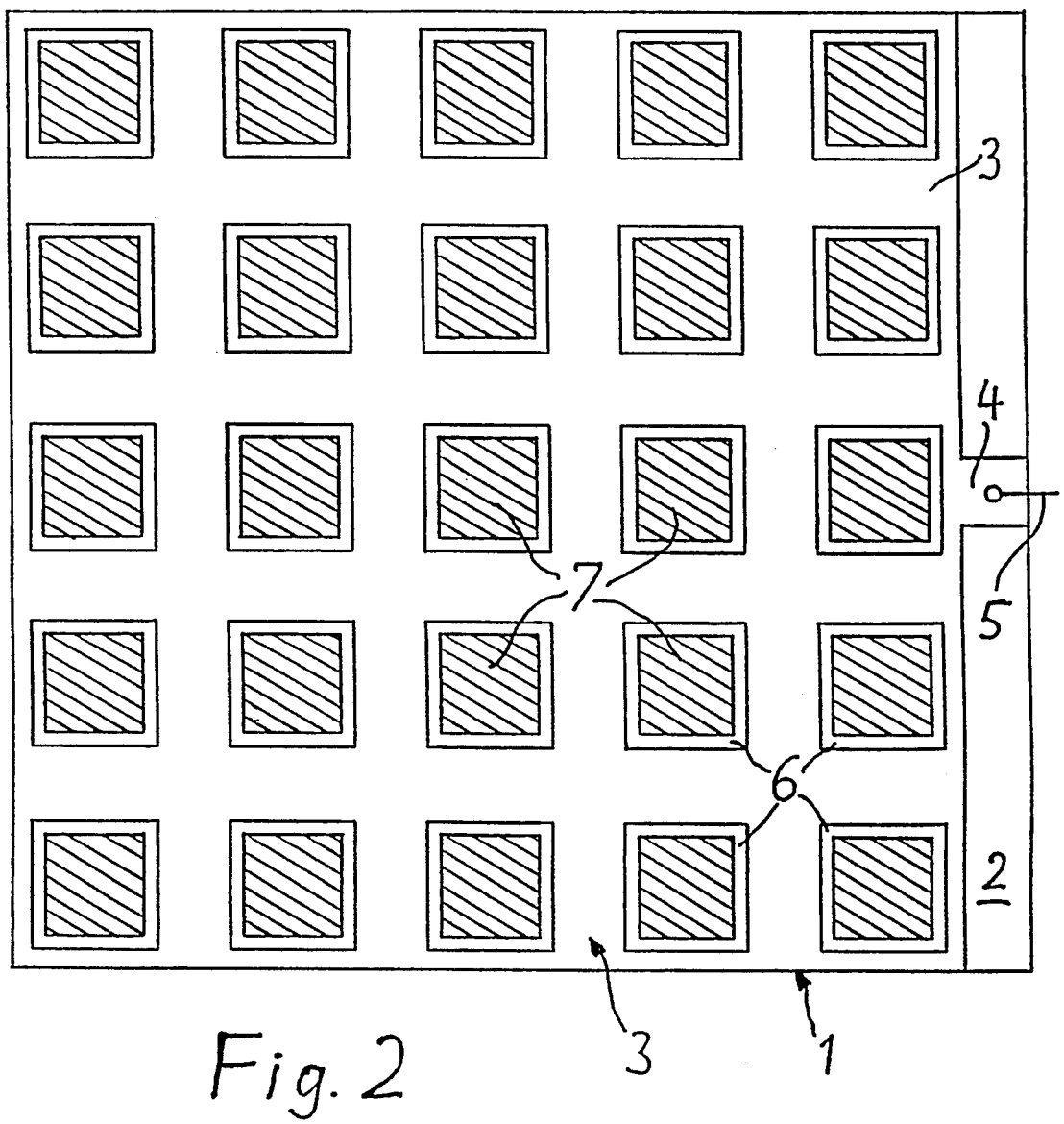
FIG. 2 A lateral cross section of the base's interior surface and a cross-section of the spacers, FIG. 3 A lateral cross section of a base with spacers formed as ridges, FIG. 4 A lateral cross section of a base with spacers formed as arched ridges, FIG. 5 A capacitive force sensor in longitudinal section. The components are made of compressible materials and shown in this section in order to demonstrate the invention's function, FIG. 6 Similar to FIG. 5, except that in this illustration, only the base material is compressible, FIG. 7 An applied example showing a force sensor in which the base and spacers are manufactured as a single unit, FIG. 8 A lateral cross section of the force sensor base illustrated in FIG. 7, FIG. 9 An applied example showing a force sensor made as two half units with half of each spacer protruding from these units. An insulating layer stretches across the entire surface between the spacers, FIG. 10 An applied example of a force sensor with a cover made of a non-conducting material, FIG. 11 An applied example of a force sensor in which the cover is overlain by a shielded electrode layer, FIG. 12 A modified force sensor showing an insulating layer overlaying the cover's surface and a second insulating layer within the base.

FIG. 2 is a lateral cross section of the base's capacitance electrode layer 3, the connecting surface 4, and the first sensor connector lead 5. The base's capacitance electrode surface 3 shows many square recesses 6 that surround the spacers 7, which are shown in FIG. 2 in cross section and in FIG. 1 in longitudinal section.

The spacers 7 determine the distance between a cover 8 and base 1, which may, for instance, be approximately 5 μm long. The cover 8's inner surface 2 is overlain by the cover capacitance electrode layer 9 and this layer faces the base capacitance electrode layer 3. The thickness of the base 1 and/or the cover 8, may be, for instance, 500 μm, which is considerably greater than the thickness of the spacers 7. Both the cover's capacitance electrode layer 9 as well as the base's capacitance electrode layer 3 show many recesses 6. These recesses allow an electric connection of the spacers 7 as well as a connector surface 10 to a second sensor connector lead 11.

The spacers 7 shown in FIG. 1 are connected to the base 1 and the cover 8 via a lower connecting layer 12 and an upper connecting layer 13.

Figure 3:
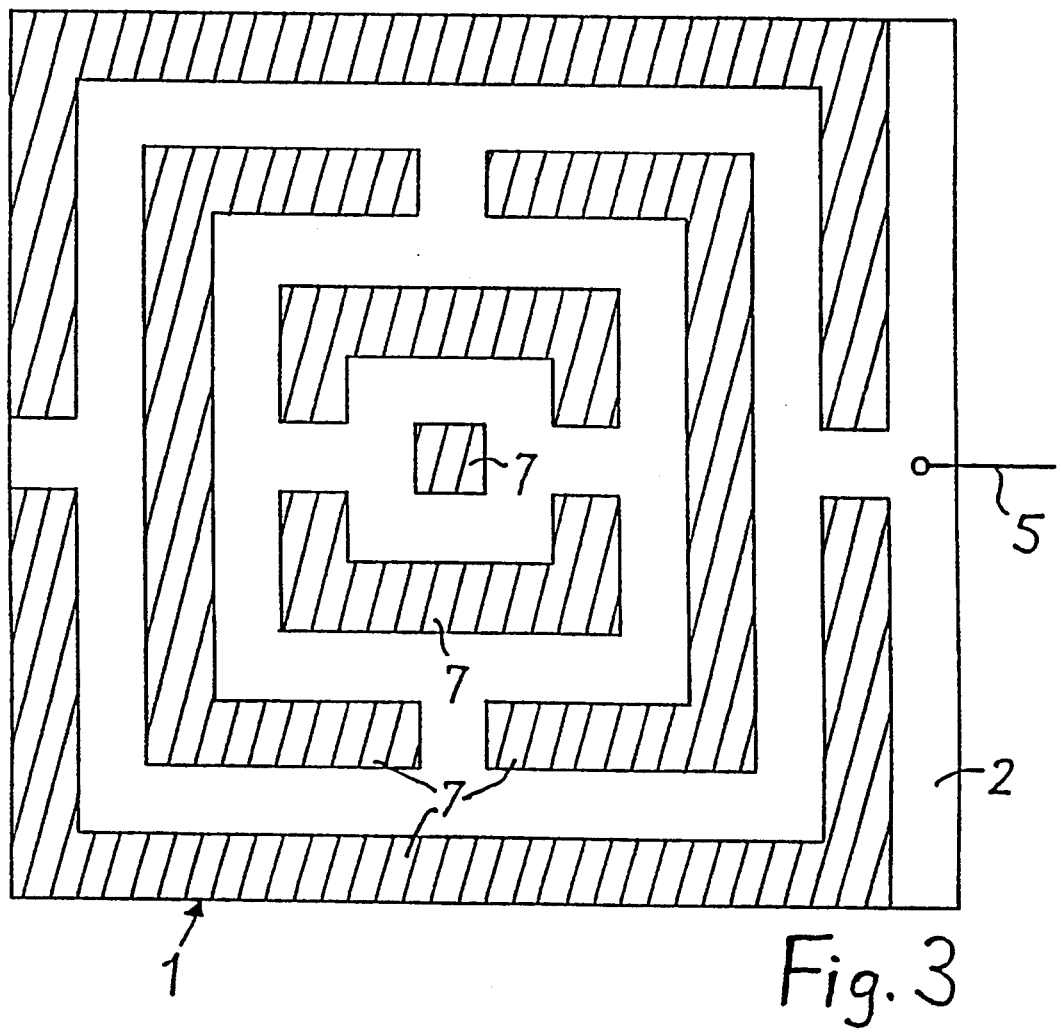

FIG. 3 shows a lateral cross section of a force sensor's base 1 in which the spacers 7 form U-shaped ridges around a single square-shaped spacer in the middle (This single spacer is similar to the spacers 7 shown in FIG. 2). The spacers 7 run along the base's inner surface 2, which is in direct contact with the sensor's connecting lead 5. Because the base 1 shown in FIG. 3 is made of a conductive material, a special capacitance electrode layer becomes unnecessary.

Figure 4:
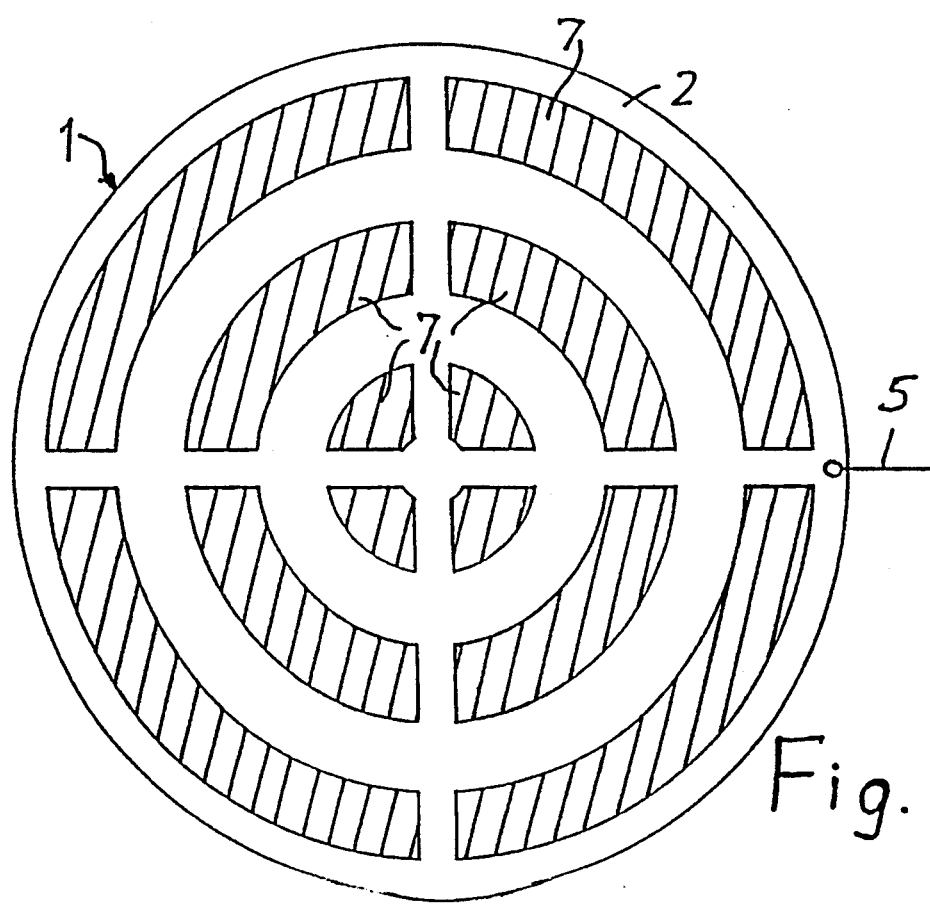

FIG. 4 is a lateral cross section along the inner surface 2 of a conductive base 1 of spacers 7 exhibiting circular-type cross sections as opposed to the rectangular shapes shown in the preceding figures. Each spacer 7 shown in FIG. 4 extends over an area contained within a 90 degree angle and these spacers thereby form, between themselves, a number of concentric hollows or cavities, and all spacers taken together form a pattern that also forms a cross-shaped hollow.

Figure 5:
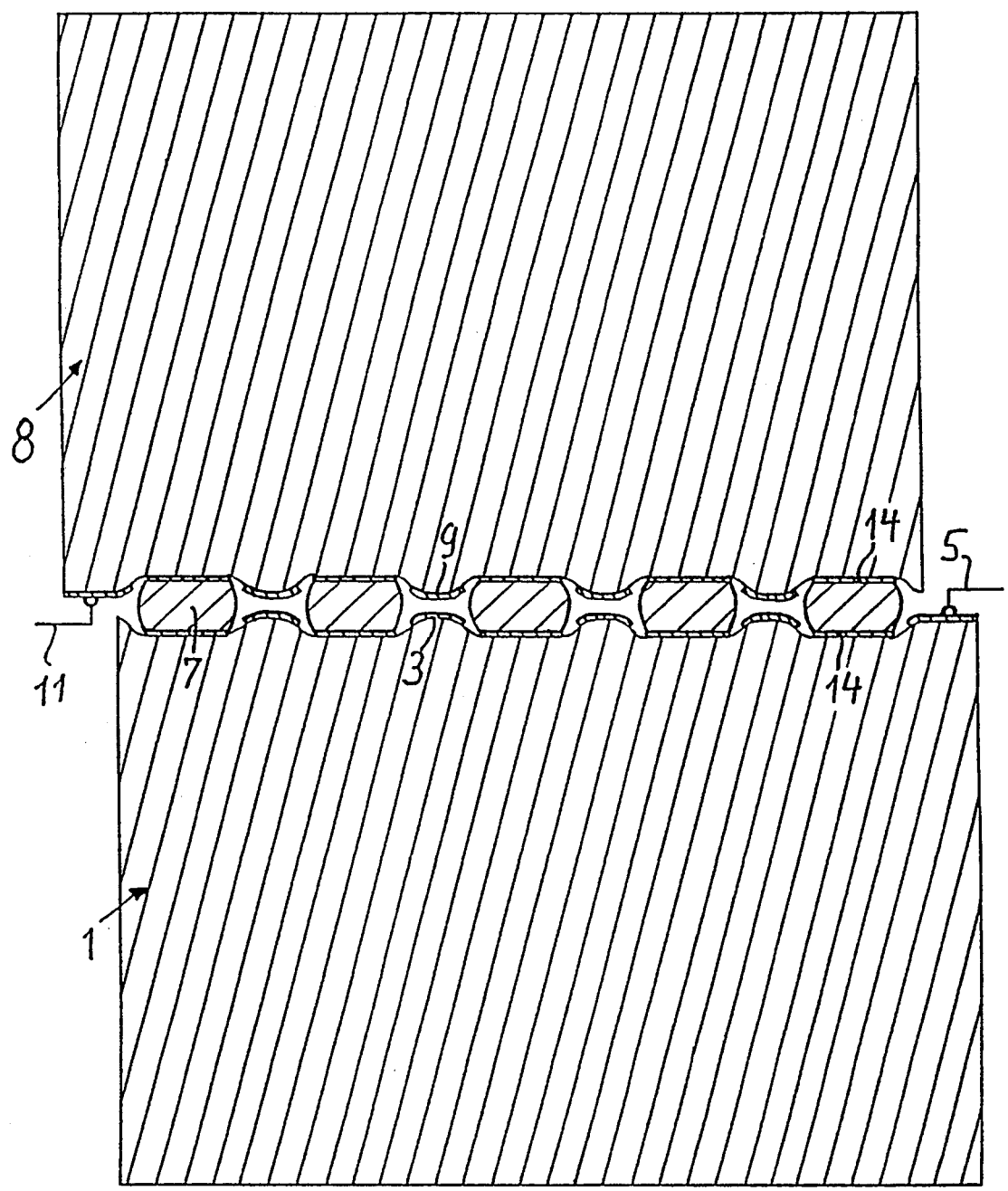

FIG. 5, which is similar to FIG. 1, illustrates a force sensor in longitudinal section in order to reveal the manner in which it functions. If the base 1, the cover 8, and the spacers 7 are made of an elastic, compressible material, and opposing forces or pressures press on the surfaces of both the base 1 and the cover 8, then these materials will deform. The modulus of compression or the elasticity constant of the material used for the base 1, the spacers 7, and the cover 8 determines the change in volume that occurs under such loads, and this change in volume alters the distance between the base capacitance electrode layer 3 and the cover capacitance electrode layer 9. This difference in distance can be seen by comparing FIGS. 1 and 5.

The example in FIG. 5 shows deformations that occur in the base 1, the cover 8, and in spacers 7 due to the material's modulus of compression. The force acts normal to the spacers 7, and this results in a slight decrease in volume and a slight decrease in the distance between the cover and the base. These effects (illustrated by squashed spacers) are exaggerated in FIG. 5. A slight indentation occurs at the contact surfaces on the inner surfaces 2 of the base 1 and the cover 8, and this brings the capacitance electrode layers 3 and 9 into closer proximity to each other. This results in an increase in the capacitance between the base capacitance electrode layer 3 and the cover capacitance electrode layer 9. The described force sensor is therefore a capacitive sensor that does not rely on the depression of a membrane for a change in capacitance, but instead relies on the differential compression of relatively massive bodies which, and this is significant, can be much thicker than the spacers 7.

Figure 6:
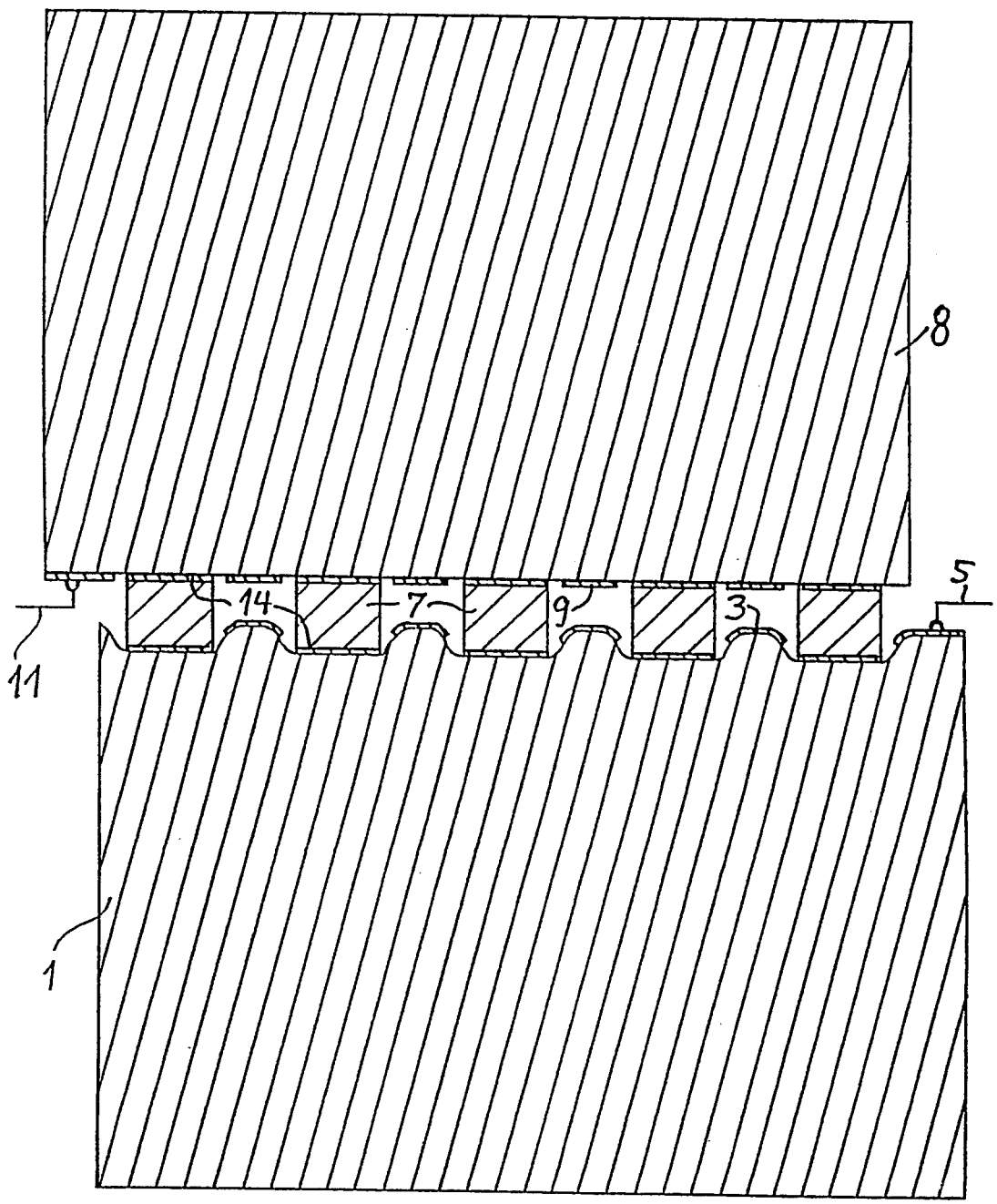

The example in FIG. 6 shows a capacitive force sensor in which the modulus of compression, or the compressibility, of the materials composing the base 1, the spacer 7, and the cover 8 results in a deformation only of the base 1, but not in a deformation of the cover 8 and the spacers 7. It is clear from FIGS. 5 and 6 that a capacitive force or pressure measurement follows when a given force acts upon the material composing the base 1, or the cover 8, or the spacers 7 if this material is compressible. The height of the spacers 7 is within the order of magnitude of the compressibility of the force-sensing system, within the designed scale of measurement. Therefore the capacitance electrode layers 3 and 9 do not come into contact when the maximum force on the scale acts upon them. In order to prevent a short circuit should excessive force be exerted on these components, one or both capacitance electrode layers can be lined with an insulating layer, which is not shown in the drawing.

The lateral distance between the spacers 7 preferably lies within the same order of magnitude as the width of the units. In FIG. 1 the height of the spacers 7 is exaggerated. In this figure, the force sensor's height (or thickness) has also been exaggerated; in actuality these force sensors are flatter than either their diameter or the lengths of their sides. Also, the number of spacers 7 can be smaller or larger than the number of units shown in the drawing. The thickness of the base 1 and the cover 8 has been chosen so that a material deformation will result from pressure or compression instead of the formation of a depression.

The spacers 7 may be designed with a bonding layer 14 at their face ends, as shown in FIGS. 1, 5 and 6. In addition to joining the spacers 7 with the base 1 and cover 8 using a structured bonding layer, it is also possible to mechanically connect the spacers 7, the base 1 and the cover 8 directly using such methods as fusing by melting, direct welding, or anodic bonding.

A force to be measured can be introduced to the capacitive force sensor as a straightforward, plane-parallel force applied to the entire outer surface of the base 1 or the cover 8. When measuring liquid or gas pressures, the thickness of the base 1 or the cover 8, whose outer surfaces must carry the pressure, must be designed so that it is sufficient to prevent a membrane-like deflection of the base 1 or the cover 8 into the hollows between the spacers. Also, the spacers 7 should be positioned so that the distance between them is sufficiently small.

These design parameters will ensure that contact between the capacitance electrode layers 3 and 9 is avoided. It follows, then, that the range of pressures and forces that can be measured is determined by the elastic characteristics of the materials used as well and the following parameters pertaining to the spacers 7: their diameter, shape, height, number, and their configuration. Given the materials and lateral outer dimensions of a force sensor, the range of measurement can be set by the geometry of the spacers 7.

The bonding layers 14, if used, are thin enough to render their influence negligible under compression. Another option is to use bonding layers 14 that exhibit elastic characteristics that do not interfere with the measurement.

The bonding layers 14 can be attached to one or both sides of the components to be connected, that is the base 1, the cover 8, and the spacers 7, depending on the technique used. They can also be composed of multiple layers and various types of materials. It is also possible to create bonding layers 14 with an appropriately thin adhesive layer. The bonding layers 14 can be formed as a layer of such electrically insulating materials as, for example, glass, Pyrex, or silicon dioxide, through which the spacers 7, base 1, and/or cover 8 are joined. Depending on how the sensor is manufactured, this connection can be achieved via welding, soldering, or anodic or electrostatic bonding.

A bonding layer 14 can also be composed of an electrically conductive material. These types of layers can be welded or soldered, or layers of metal or silicon can be applied using vacuum evaporation, cathodic sputtering, or separation techniques. The bonding layers 14 may also be made of several layers of various types of materials. The connection can be achieved by welding, soldering, bonding or adhesion.

The materials for the bonding layers 14, the base 1, the spacers 7, and the cover 8 should be chosen so that the electric conductivity of these materials does not short circuit the capacitance created within the force sensor. Should the bonding layers 14 be composed of non-conductive material, then the base 1, spacers 7, and cover 8 may be composed of electrically conductive materials. If the base 1 or the cover 8 are composed of an electrically conductive material, then the capacitance electrode layers 3 and 9 become redundant because, as shown in FIGS. 3 and 4, the base 1 and the cover 8 function as electrodes for the force sensor's capacitance.

Electrically conductive materials that can be used in the manufacture of these force sensors include metals, semiconductors and particularly silicon. Nonconductive materials include ceramic, quartz, glass and oxide. The force sensor shown in FIG. 1 has metallic capacitance electrode layers 3 and 9, but these could also be made of quartz glass, for instance.

Figure 7:
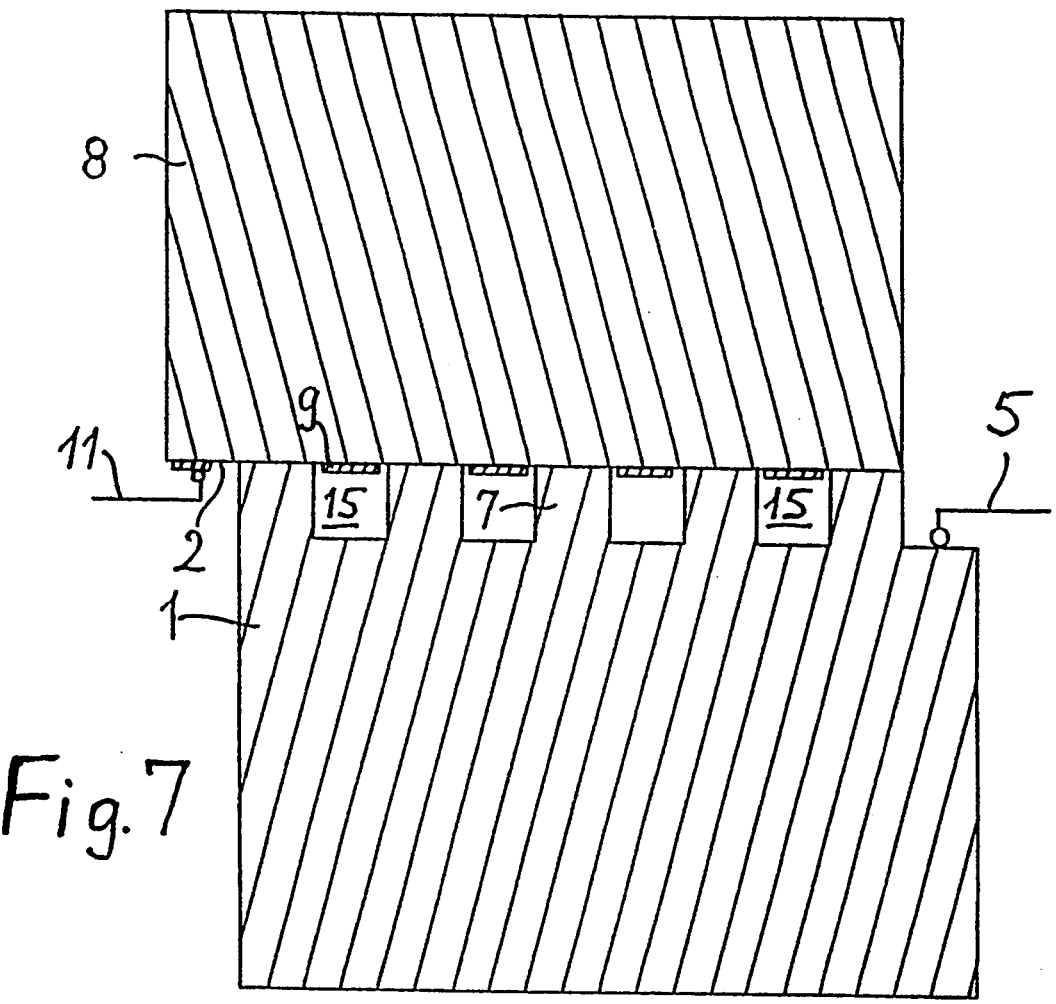
Figure 8:
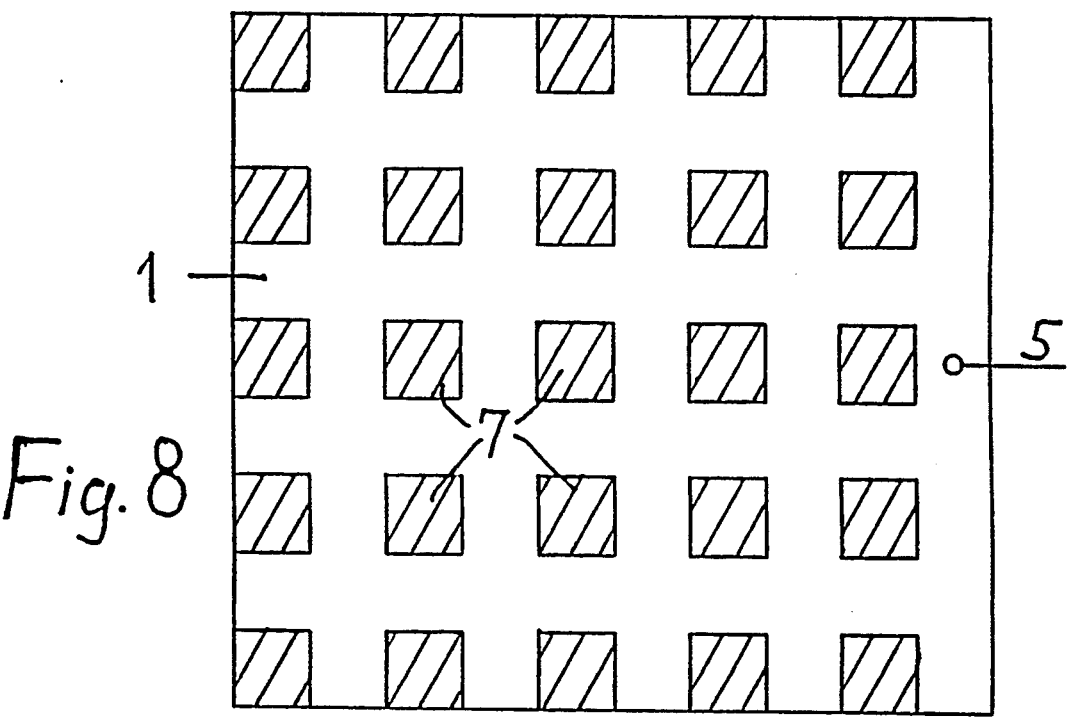

FIG. 7 shows a longitudinal section of a force sensor in which the spacers 7 and the base 1 are made as a single unit. The spacers 7 of the base 1 can be created by deepening the recesses 15 through milling or etching. FIG. 8 shows a lateral cross section of one possible configuration for the spacers 7.

The base 1 in the example in FIGS. 7 and 8 is composed of a conductive material that connects directly to the sensor's connector lead 5. This base 1 thus serves as the sensor's first capacitance electrode and may be composed of, for example, conductive silicon. The cover 8 can be made of a glass such as Pyrex, and the base 1 and cover 8 can then be joined by anodic bonding. The sensor's second capacitance electrode is the capacitance electrode layer 9. This layer is applied to the cover 8 and faces the inner surface 2 of the base 1. Its configuration is determined by the recesses 15 of the base 1. This layer can be composed of a metal that is applied by such methods as vacuum evaporation or cathodic sputtering. Aluminum is an example of a suitable metal.

The spacers 7 for the force sensor in FIG. 7 can also be manufactured by applying a sufficiently thick coating onto the base 1 and then creating the desired pattern of spacers by masking and etching this layer. It is also possible to create a configuration of spacers by employing such processes as separation or cathodic sputtering of such materials as oxides, polysilicon, epitactic silicon, glass, or Pyrex. Another possibility includes using a chemical process to create a coating. One such process is oxidation, which could be carried out on the base's surface. The spacers 7 in the force sensor in FIG. 7 could be created in this manner by employing the process of thermal oxidation of silicon.

Figure 9:
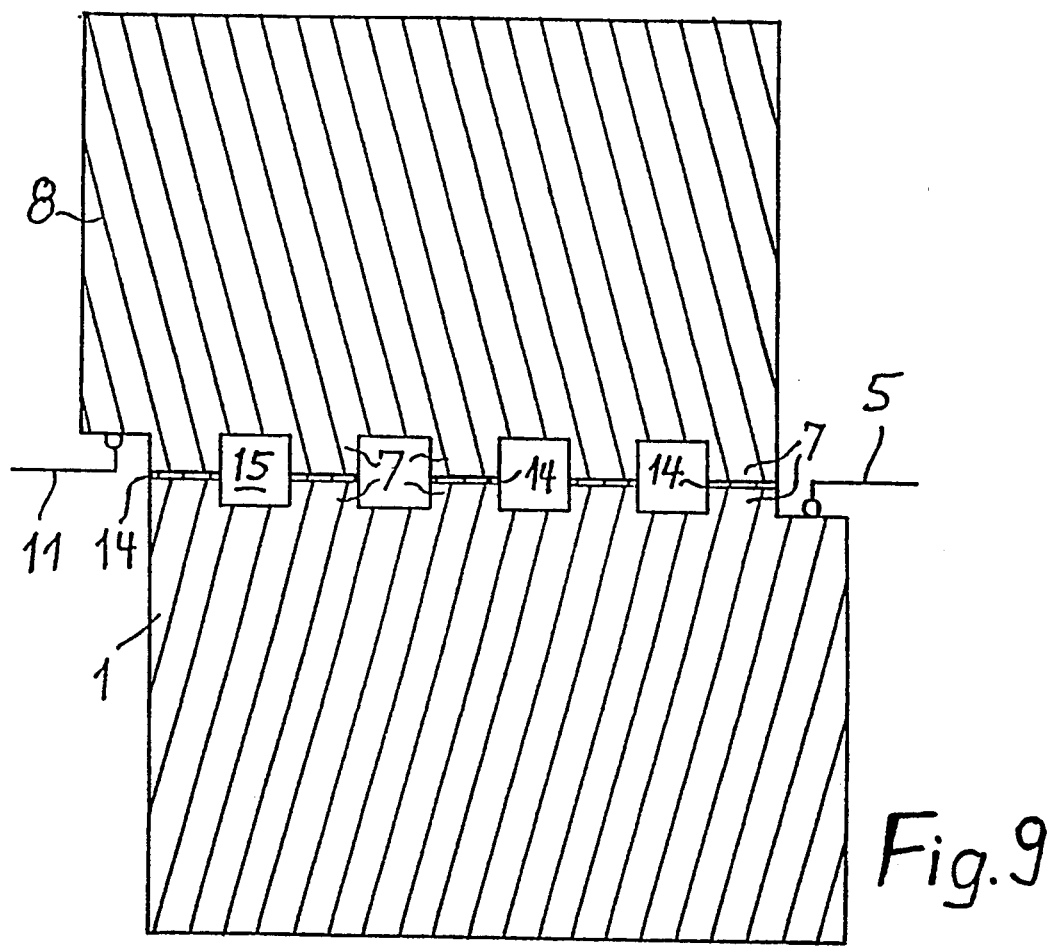

FIG. 9 illustrates in longitudinal section a force sensor employing an insulating bonding layer 14. This force sensor is composed of two conductive silicon disks and the spacers 7 are part of the body of both the base 1 the cover 8. Half of the spacers are worked into the base 1, and the other half are worked into the cover 8. The spacers result when the recesses 15 are enlarged on the surfaces of the base 1 and the cover 8. One way to manufacture this type of force sensor is to cover the base with an insulating bonding layer 14 composed of, for example, Pyrex, and this layer is then coupled with the cover 8 via, for example, anodic bonding. It is also possible to coat both the base 1 and the cover 8 with an insulating layer 14 consisting of, for instance, silicon dioxide, and to then fuse the insulating layers 14 by applying the required amount of pressure and heat. This design yields a simple force sensor in which the base 1 and cover 8 act as electrodes.

Figure 10:
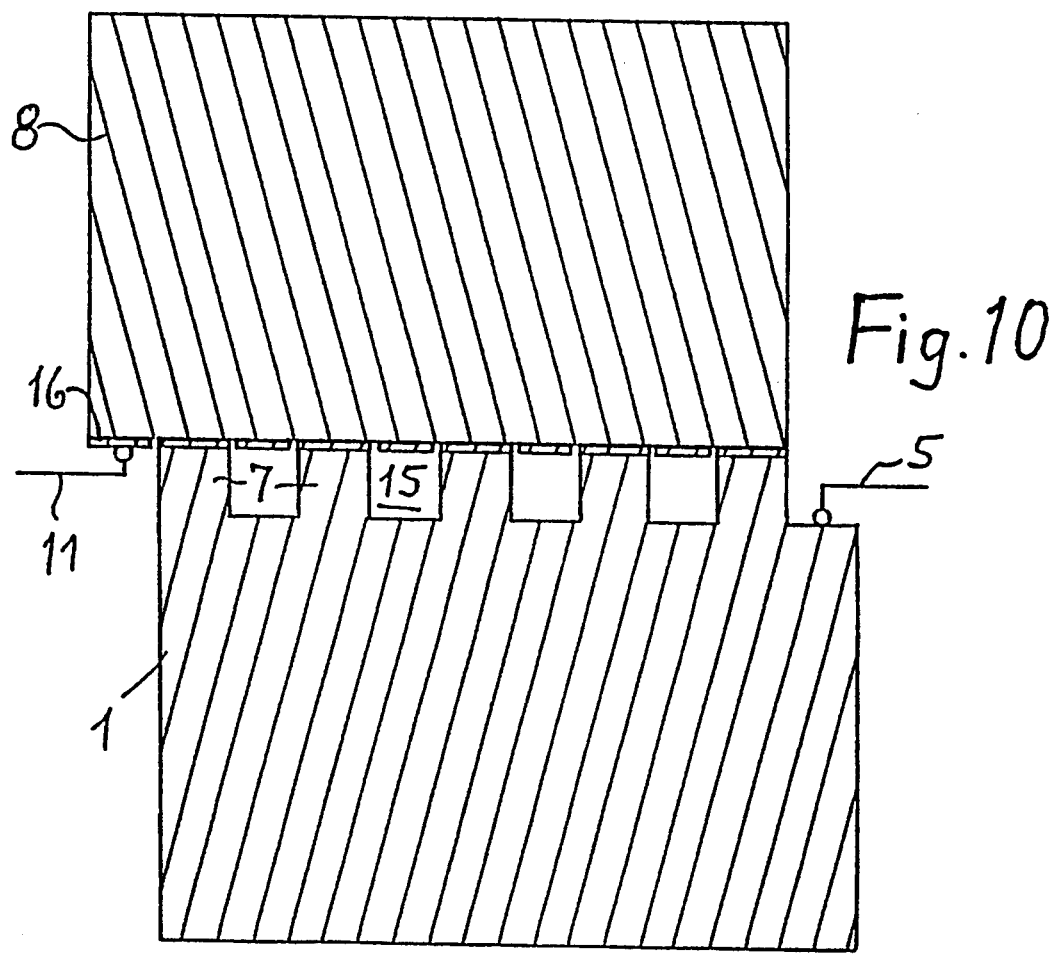

FIG. 10 shows another example of a capacitive force sensor that makes use of the compressibility of materials.

The base I of the force sensor shown in FIG. 10 consists of conductive silicon and the base thereby acts as an electrode and also is directly connected to the sensor's connector lead 5. The spacers 7, composed of conductive silicon, are worked out of a single unit in the manner described above.

The cover 8 in the example shown in FIG. 10 is composed of a non-conductive material such as ceramic, quartz, or glass, and the under side of the cover is coated with a layer of gold 16. In order to improve the bonding or adhesion between the gold layer and the cover 8, it may be useful to apply an intermediate layer of chrome or nickel. In FIG. 1 0, the cover 8 is joined with the silicon spacers 7 by means of the gold layer 16, which consists of a eutectic gold-silicon alloy. The gold layer 16, which in this example serves as a contact layer, does not fill into the recesses around the spacers 7 and this layer can therefore serve simultaneously as a capacitance electrode. In order to ensure conductivity, it can be useful to also coat the silicon spacers 7 with a layer of gold.

In the manufacture of capacitive force sensors making use of the compressibility of materials, it may serve certain purposes to combine layers of insulating and conductive materials when fabricating bonding layers 14. Depending on the materials used, adhesion between a metal layer and the base 1 or cover 8 and the spacers 7 may be improved by using, for instance, an insulating film. There may be advantages to using multi-layered bonding layers 14 if they will be exposed to thermal expansion and tension. For these and other reasons, including, for example, to achieve certain elastic characteristics, or to create additional shielded electrodes (compare to FIG. 11 ), it may be beneficial to use a multi-layered design for the base 1 or cover 8, and/or the spacers 7 instead of manufacturing these components from a uniform material.

As already described above, it can also be useful to coat the capacitance electrode layers 3 and/or. 9, or the inner surface 2 of the base 1 or cover 8 (if either of these are made of conductive material and are to serve as capacitance electrodes) with an insulating layer in order to avoid a short circuit should a large deformation result in the electrodes making contact.

Figure 11:
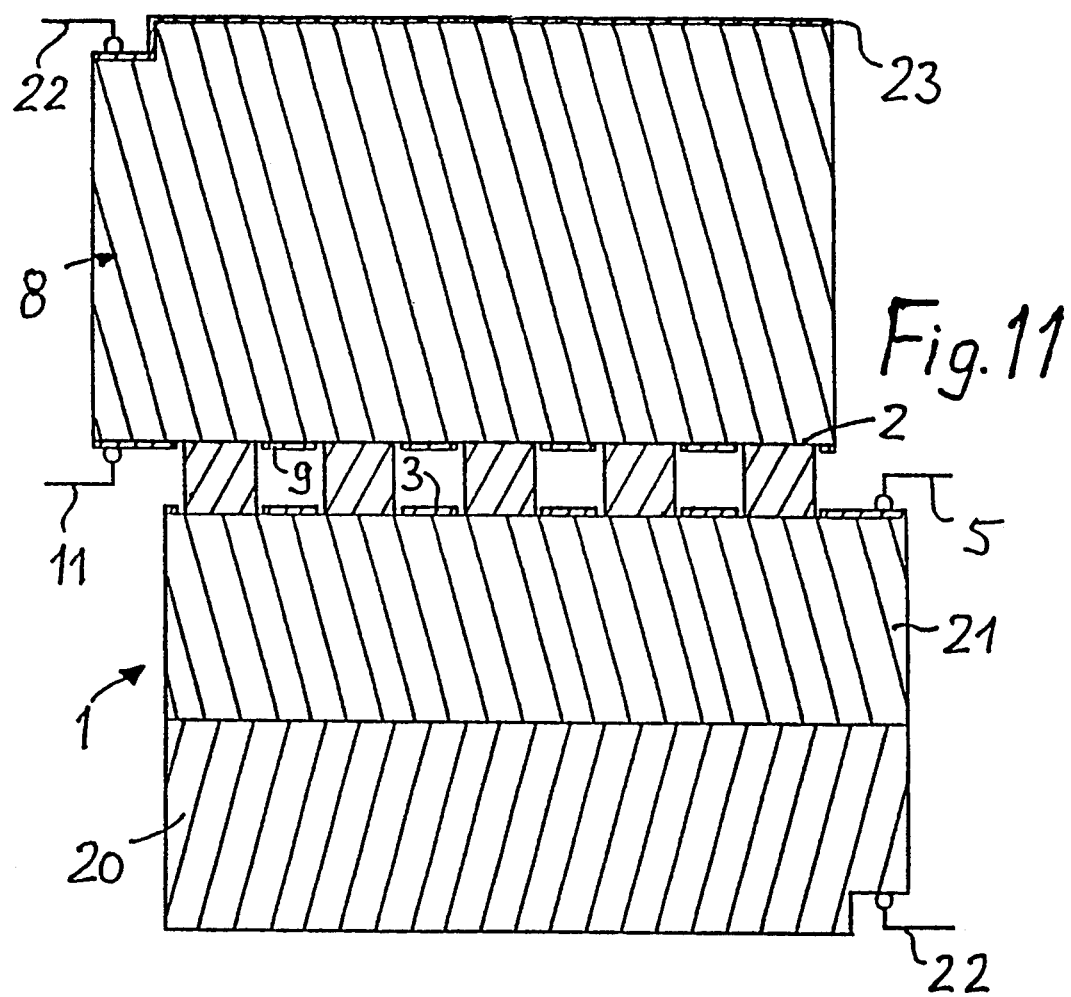

If the base 1 and/or the cover 8 is made of an insulating material, extra electrodes can be added through an external conductive layer or device, thus allowing external shielding of one or both sides of the force sensor. This can be achieved, for example, if these electrodes are grounded. An example of such a force sensor is shown in FIG. 11. The base 1 of the force sensor shown in FIG. 11 consists of multiple layers. The lower half 20 of the base 1 consists of a conductive material and the upper half 21 consists of a non-conductive material. The conductive lower half 20 is connected to a shielding lead 22, which facilitates a connection to ground. The non-conductive upper half 21 of base 1 is overlain by the base capacitance electrode layer 3, and this layer is in contact with the sensor's connector lead 5. The sensor's second connector lead 11 is connected to the cover's capacitance electrode layer 9, which is located on the inner surface 2 of the non-conductive cover 8. As shown in FIG. 11, a shielded electrode layer 23 overlays the top surface of the cover 8, and this layer can also be connected to ground via a shielding lead 22.

Figure 12:
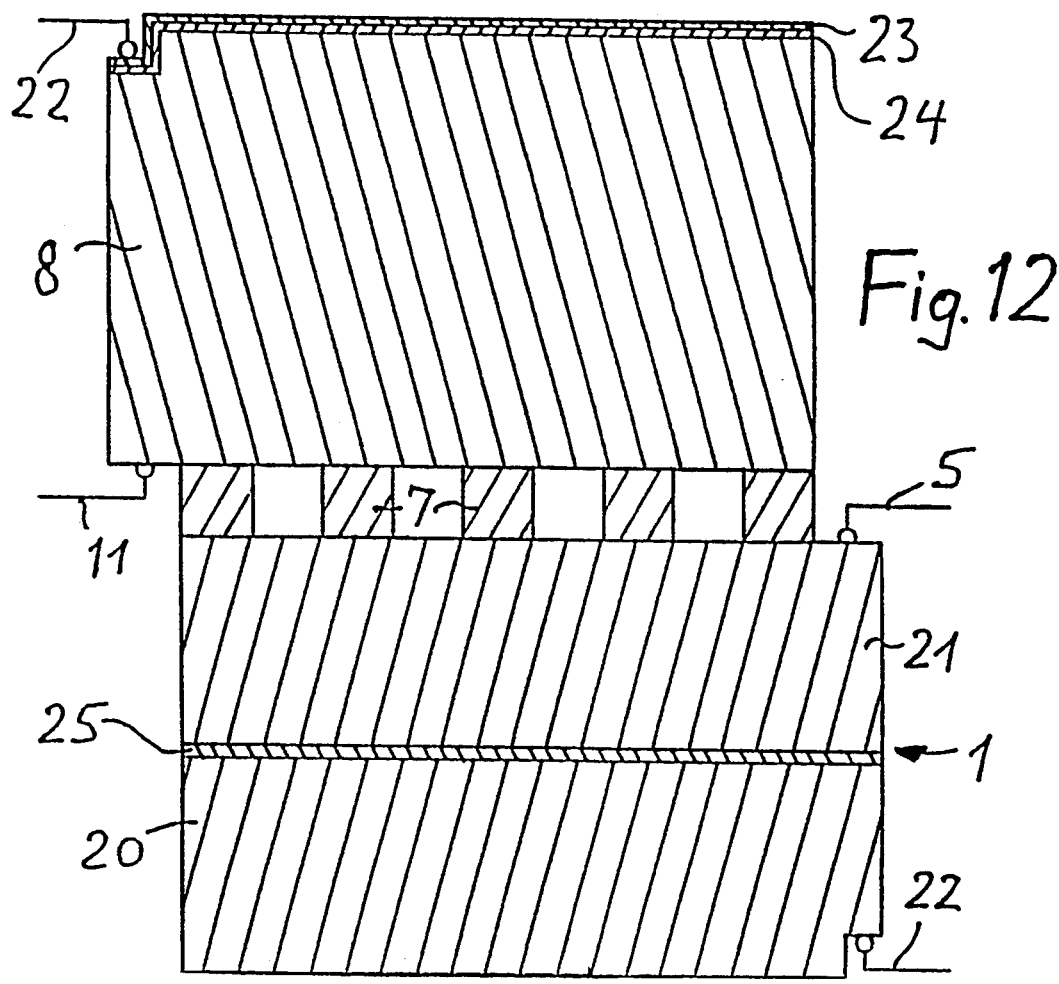

FIG. 12 illustrates an example in which the cover 8 is made of conductive material and the cover is overlain by an insulating layer 24, and this layer is overlain by the shielding electrode layer 23. Because the cover 8 serves as a capacitance electrode, it is connected directly to the sensor's connector lead 11. The spacers 7 in FIG. 12 are composed of a non-conducting material, the upper half 21 of base 1 is composed of conductive silicon, and the lower half 20 of the base 1 is composed of silicon. The two base halves are electrically insulated from each other by a Pyrex layer 25. Mechanically, the lower half 20 and upper half 21 are anodically bonded together. The lower half 20, which serves as a shielding electrode body, can be connected to ground via the shielding lead 22.

FIGS. 13 through 16 illustrate an example of a capacitive force sensor in which the cover 8 and base 1 are composed of a conductive material, particularly silicon. It is obvious that a base 1 or cover 8 composed of a conductive material can be used as a shielding electrode body (ies). In this case the capacitance electrode layers 3 or 9 must be insulated from the conductive base 1 or cover 8. For this reason, the structured insulating layers 26 and 27 are applied to the base 1 and cover 8. The dimensions of the insulating layers 26 and 27 as well as the capacitance electrode layers 3 and 9 have been chosen so that a sufficient clearance exists between them and the conductive spacers 7. The spacers 7, which are trapezoidal in cross section, are created by etching cavities into the base 1.

The spacers 7, which are composed of conductive silicon, are connected both mechanically and electrically to the underside 2 of the cover 8 via a conductive bonding layer 14.

Figure 13:
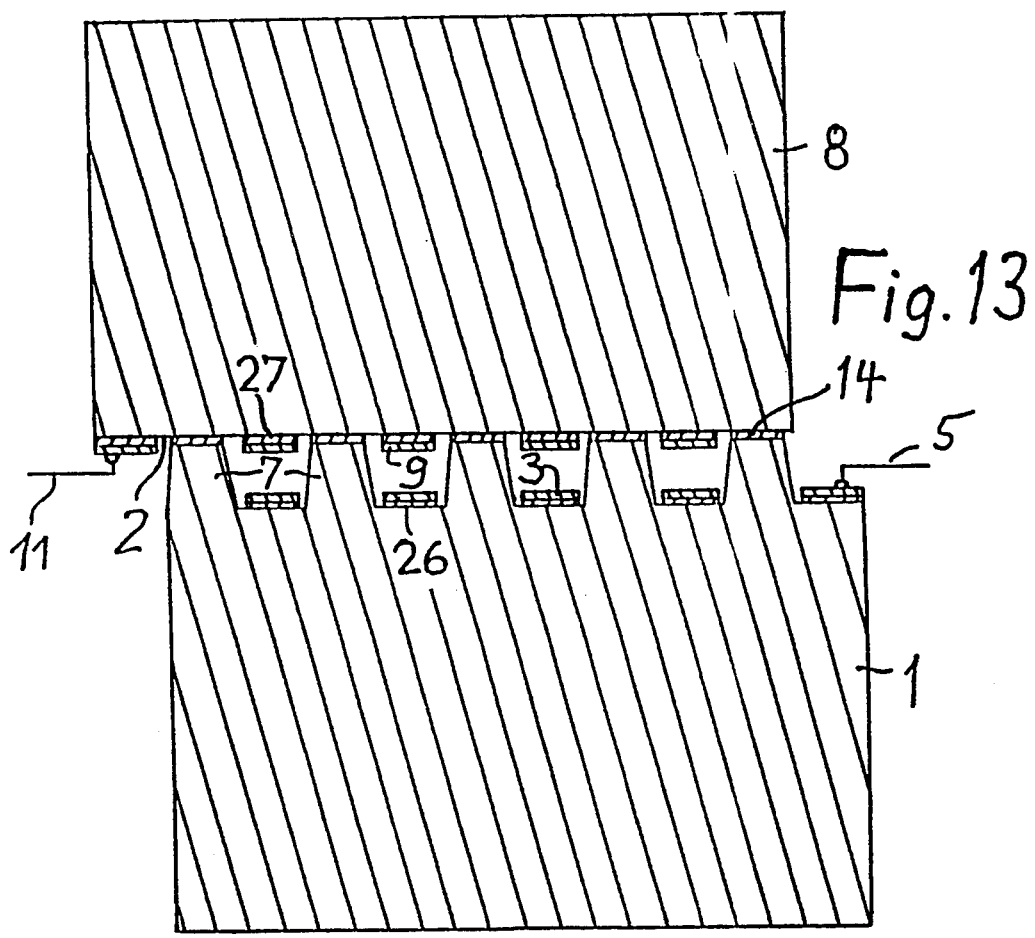
FIG. 13 A force sensor showing a base and cover that are in mechanical and electrical contact. The longitudinal section is taken along the sensor connector leads, FIG. 14 The same force sensor shown in FIG. 13, but illustrating the longitudinal section along the shield connector lead, FIG. 15 A lateral cross section of the cover of the force sensor shown in FIGS. 13 and 14, FIG. 16 A lateral cross section of the base of the force sensor shown in FIGS. 13 and 14, FIG. 17 An example of a force sensor applied to measurements of absolute forces or pressures. This illustration shows areas that have been doped, FIG. 18 A lateral cross section of the cover of the force sensor shown in FIG. 17, FIG. 19 A lateral cross section of the base of the force sensor shown in FIG. 17, FIG. 20 A longitudinal section taken along the connector lead of a force sensor with an especially simple design, FIG. 21 A longitudinal section along the shield connector lead of the force sensor shown in FIG. 20, FIG. 22 An example showing a force sensor with a very simple design that is suited to measuring absolute pressures. This illustration shows a longitudinal section along the sensor's connector lead, FIG. 23 A longitudinal section along the shield connector lead of the force sensor shown in FIG. 22, FIG. 24 A lateral cross section of the cover of the force sensor shown in FIGS. 22 and 23, FIG. 25 A lateral cross section of the inside of the base of the force sensor shown in FIGS. 22 and 23.
Figure 14:
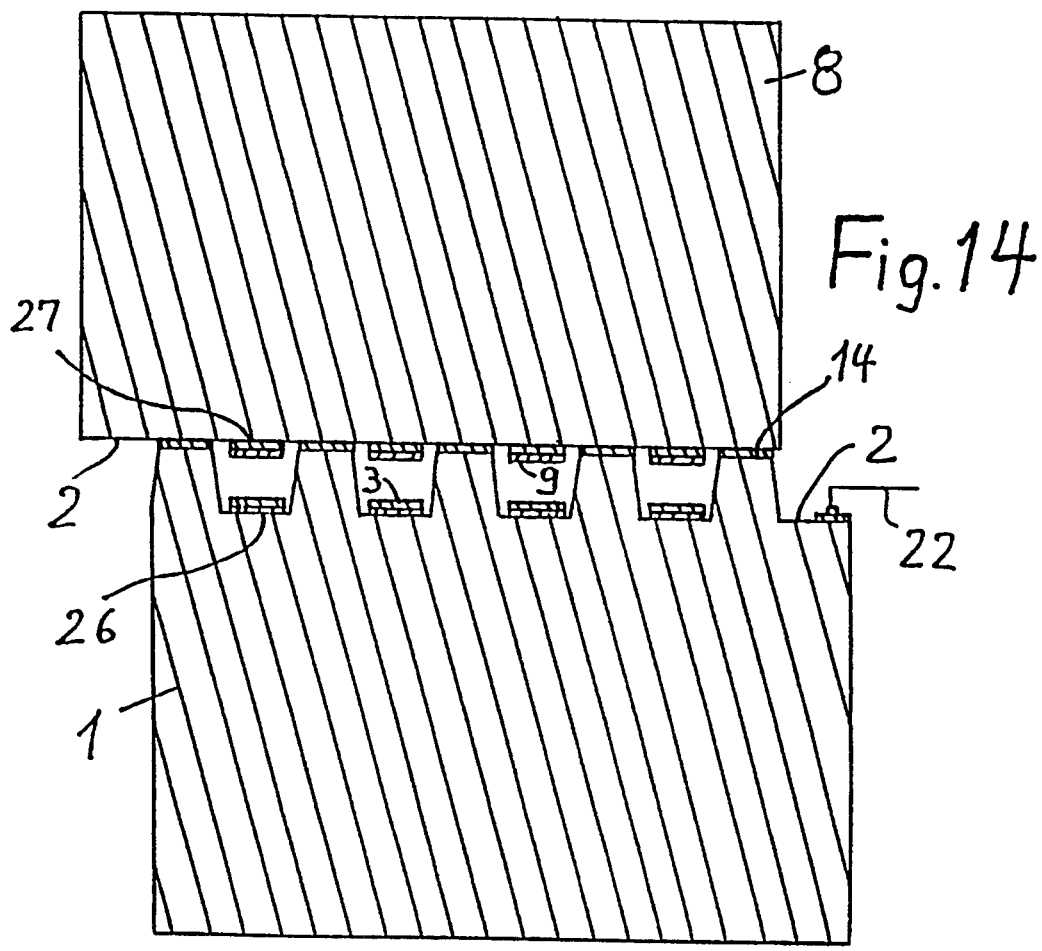
Figure 15:
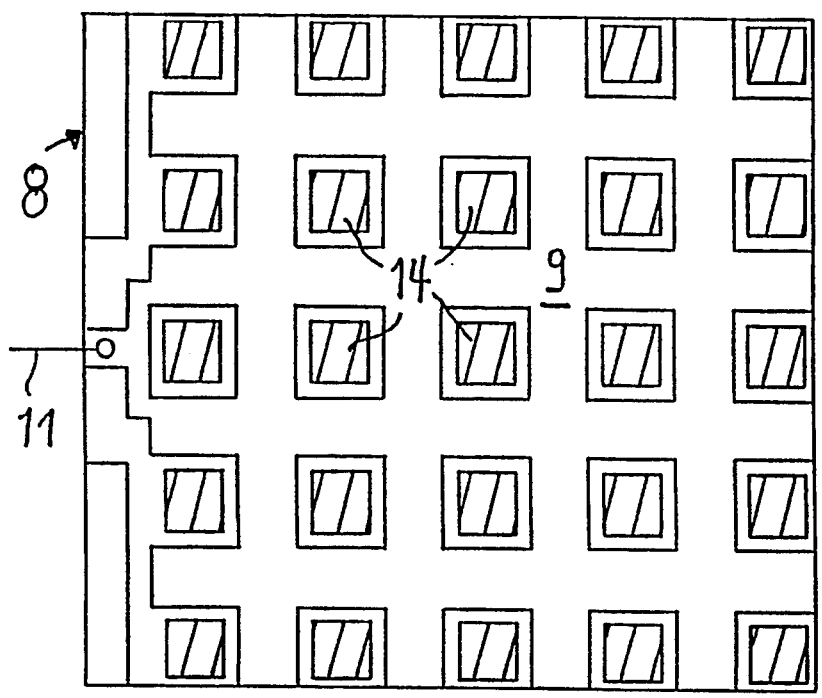
Figure 16:
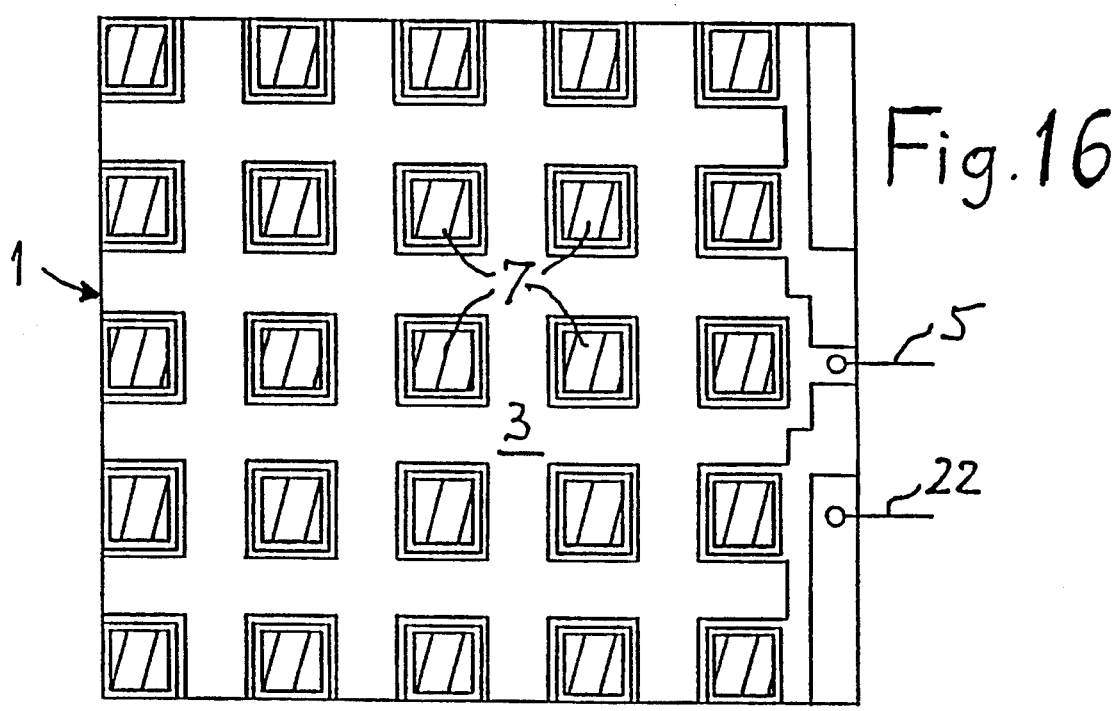

The capacitance electrode layers 3 and 9 should preferably be composed of a layer of metal or an electrically conductive polysilicon, and this material should not fill into the area surrounding the spacers 7. The insulating layers 26 and 27 should be made, preferably, of thermally-formed silicon dioxide. The electrically conductive bonding layer 14 should preferably consist of a eutectic silicon alloy, two examples of which are gold-silicon or aluminum-silicon. In this design, the base 1 and cover 8 silicon bodies are connected both mechanically and electrically, and further connection between the two silicon bodies is unnecessary. FIG. 14 shows that the shielding lead 22 and the base 1 are ohmically connected. FIG. 13 is a longitudinal section showing the sensor's connecting leads 5 and 11, and FIG. 14 is a longitudinal section showing the force sensor's shielding lead 22. FIG. 15 is a lateral section showing the inner surface 2 of the cover 8, and FIG. 16 is a lateral section showing the base 1.

Sound mechanical bonding between the base 1 and the cover 8 can be achieved by coating the areas to be bonded with silicon dioxide and then fusing the surfaces using pressure and heat. If this method is used, then the base 1 as well as the cover 8 must be in contact with a shielding lead 22, or they must be otherwise electrically connected, for example, via bumps or an external connection, which are not illustrated in the drawing. Silicon direct bonding is a further option that achieves mechanical bonding of the force sensor's silicon bodies shown in FIGS. 13 and 14.

The outer surfaces of the base 1 and the cover 8 can be coated with a hard protective coating, but this is not shown in FIGS. 13 and 14.

Figure 17:
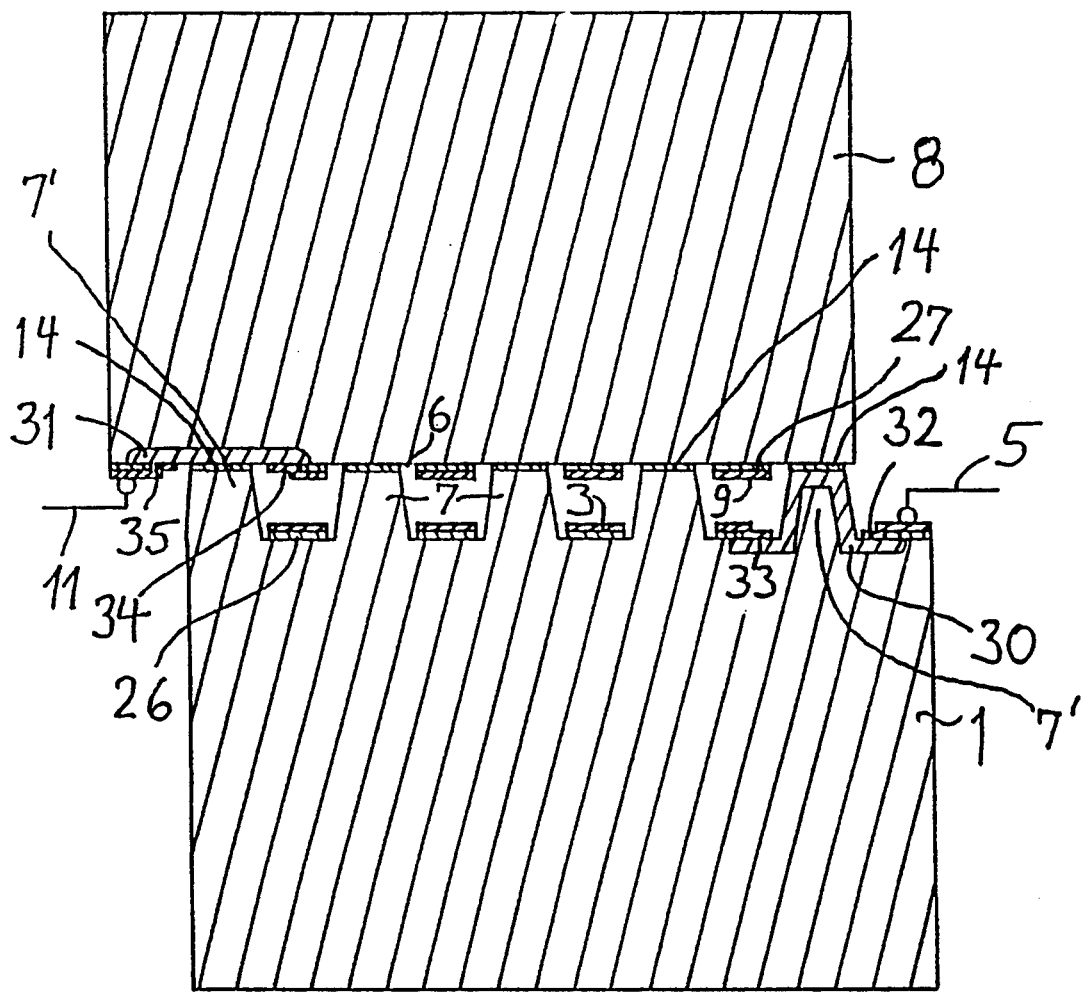
Figure 18:
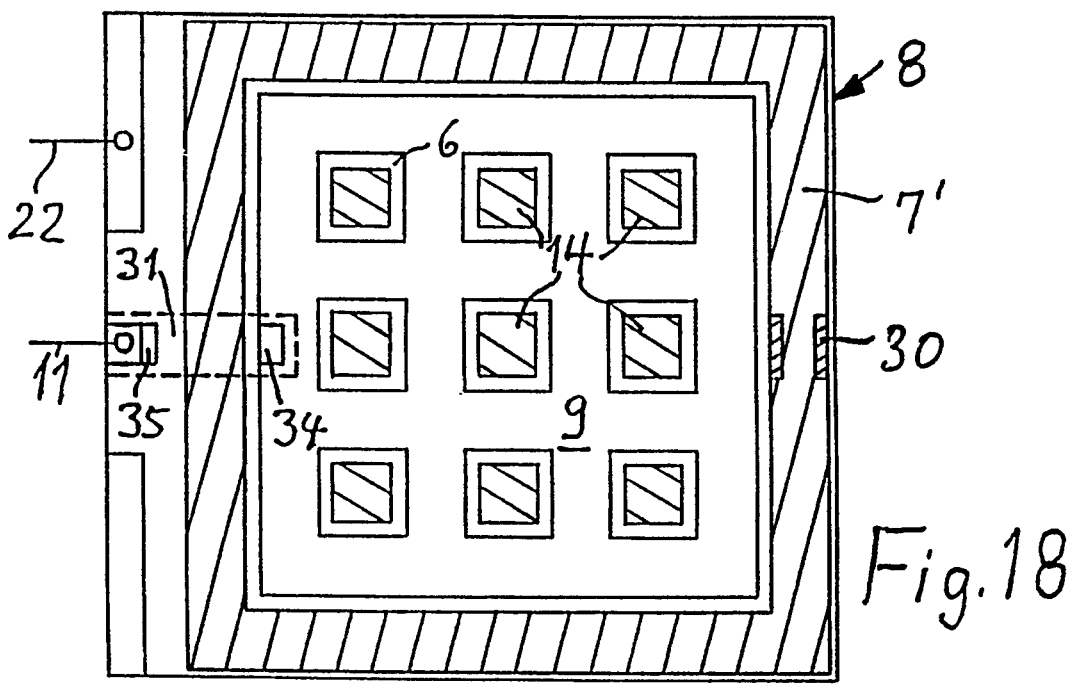
Figure 19:
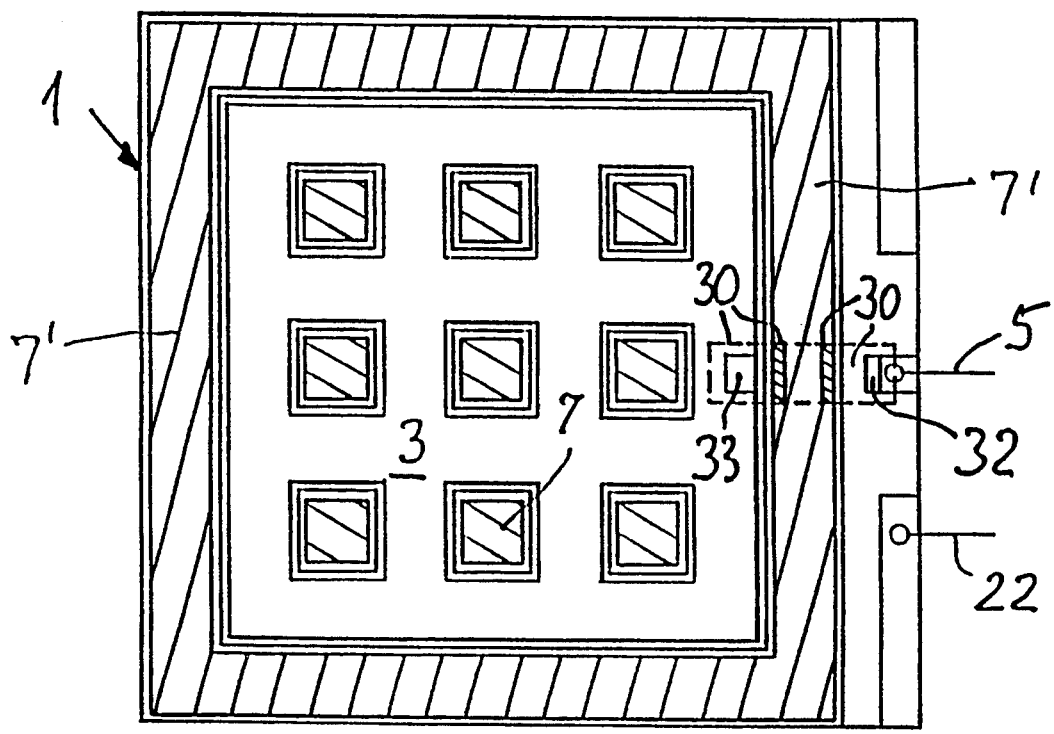

Another example of a force sensor is shown in FIG. 17, 18, and 19. This sensor measures absolute forces or pressures. The base 1 and the cover 8 shown in FIG. 17 in longitudinal section should be preferably composed of silicon. The spacers 7 are trapezoidal in longitudinal cross section, as shown in FIG. 17, and are etched out of the base 1. A non-conductive connection between spacers 7 and the silicon cover 8 is achieved via an electrically insulating bonding layer 14.

As can be seen by FIGS. 18 and 19, most of the spacers 7 are square in lateral cross section. The exception to this is the spacer 7', which appears at the far right and far left of the force sensor illustrated in FIG. 17. FIGS. 18 and 19 show these spacers 7' as having the shape of a square frame in lateral cross section, and this shape allows hermetic sealing within the sensor and thereby enables it to measure absolute forces and pressures. Because the frame-like design of the spacer 7' allows no channel leading out of the interior spaces between the spacers 7, the silicon plates of the base 1 and cover 8 in FIGS. 17 through 19 are shown with the doped areas 30 and 31. The doped area 30 builds an insulating p-n junction with the silicon-based material of the base 1, and this junction, together with an appropriate barrier voltage, acts as an insulator. The same is true of the doped area 31 in cover 8, which extends in a flat shape along a portion of the inner surface 2 of cover 8, while the doped area 30 of the base 1 (as shown in FIG. 17 through 19), extends as a band-like bridge across the frame-like spacer 7'.

The base's capacitance electrode layer 3 is insulated from the silicon material of the base 1 by the insulating layer 26, and the cover's capacitance electrode layer 9 is insulated from the silicon material by the insulating layer 27. The insulating layers 26 and 27 are provided with the windows 32, 33, 34, and 35, however, through which the capacitance electrode layers 3 and 9 are electrically connected to the doped areas 30 and 31. In this manner, the doped areas 30 and 31 electrically connect the base capacitance layer 3 and the cover capacitance layer 9 to the sensor leads 5 and 11. The doped areas 30 and 31 serve the purpose of connecting the force sensor's internal capacitance electrodes to the external sensor leads 5 and 11 by creating a lead through the sealed outer spacer 7'.

Figure 20:
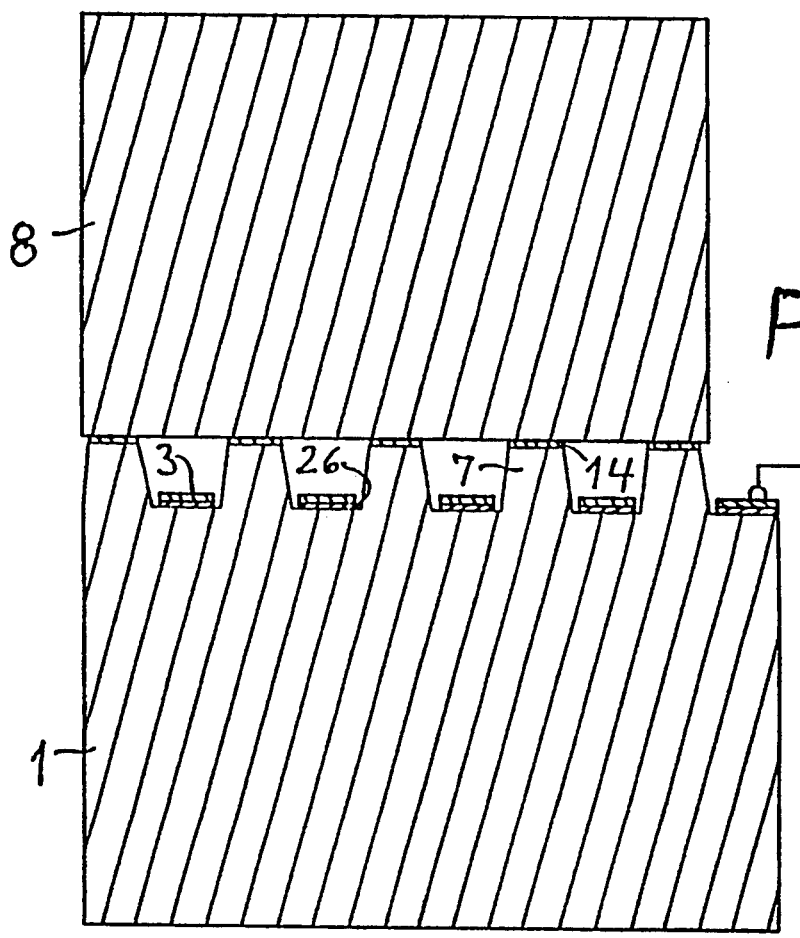
Figure 21:
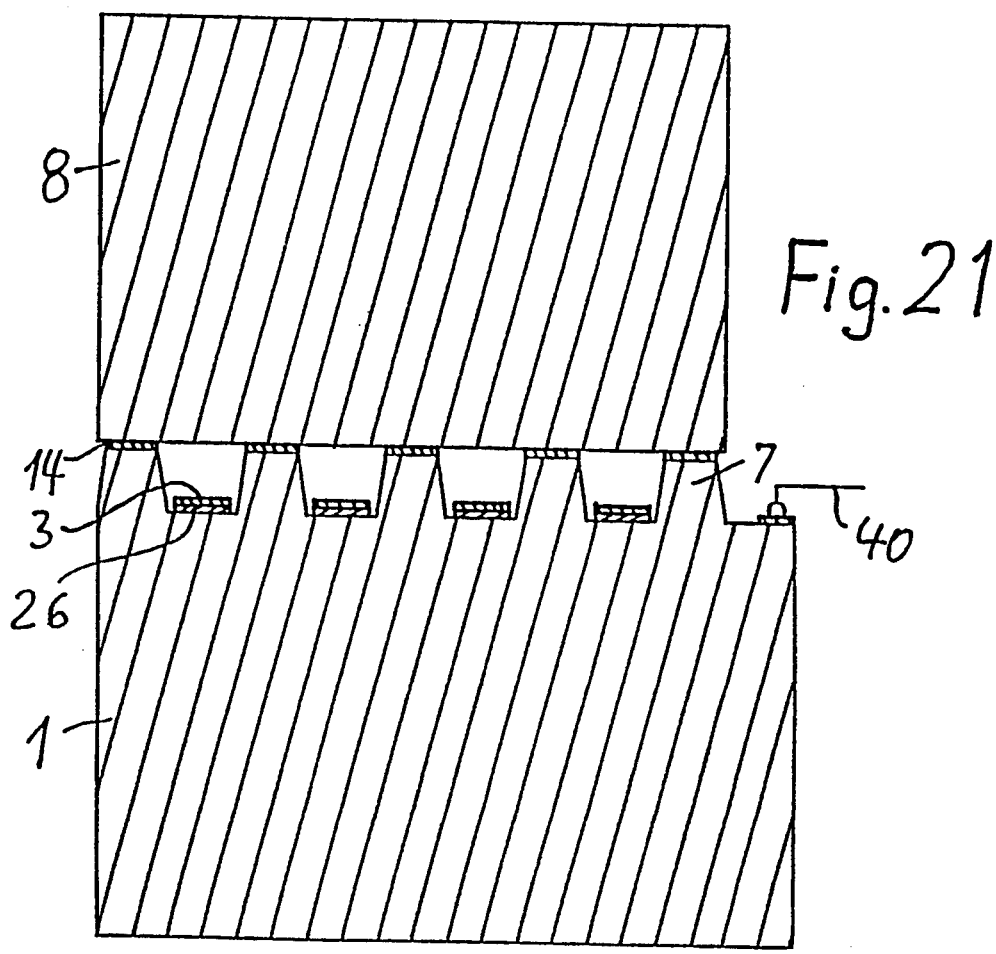

FIGS. 20 and 21 illustrate an example of a very simple force sensor which results when one of the force sensor's capacitance electrodes is connected to the shielding ground. FIGS. 20 and 21 show a longitudinal section of such a sensor, and a lateral cross section of the base 1 corresponds to the cross section shown in FIG. 16. The preferred material for the base 1 and the cover 8 of the force sensor shown in FIGS. 20 and 21 is silicon. The cover 8 serves simultaneously as the capacitance electrode and the shielding electrode, and is connected both mechanically and electrically to the silicon material of the base 1 via the conductive bonding layer 14. The bonding layer 14 is preferably composed of a eutectic alloy of gold-silicon or aluminum-silicon. The base's capacitance electrode layer 3 is electrically insulated from the base by the insulating layer 26. The sensor's connector lead 5, which can be seen in FIG. 20, is the electrical contact to this first capacitance electrode. The second electrode is formed by the silicon material of cover 8 and base 1, and this electrode is connected by way of the shield- and sensor lead 40.

The capacitance measured by this type of sensor comes into being, on the one side, between the base's insulated capacitance electrode layer 3 and the cover 8 (these components are sensitive to force or pressure) and on the other side, via a component that is not sensitive to force or pressure; instead its capacitance comes into being based on the dielectric properties of the insulating layer 26 as opposed to the amount of space between the cover 8 and the base capacitance electrode layer 3.

FIGS. 22 through 25 show a similar simple force sensor designed to measure absolute forces and pressures. Design details are shown in FIGS. 22 through 25, and many of these details are already described above. As before, the preferred material for the base 1 and cover 8 is silicon. The spacers 7 within the interior section are surrounded by the frame-like spacer 7', which functions to seal the interior.

Figure 22:
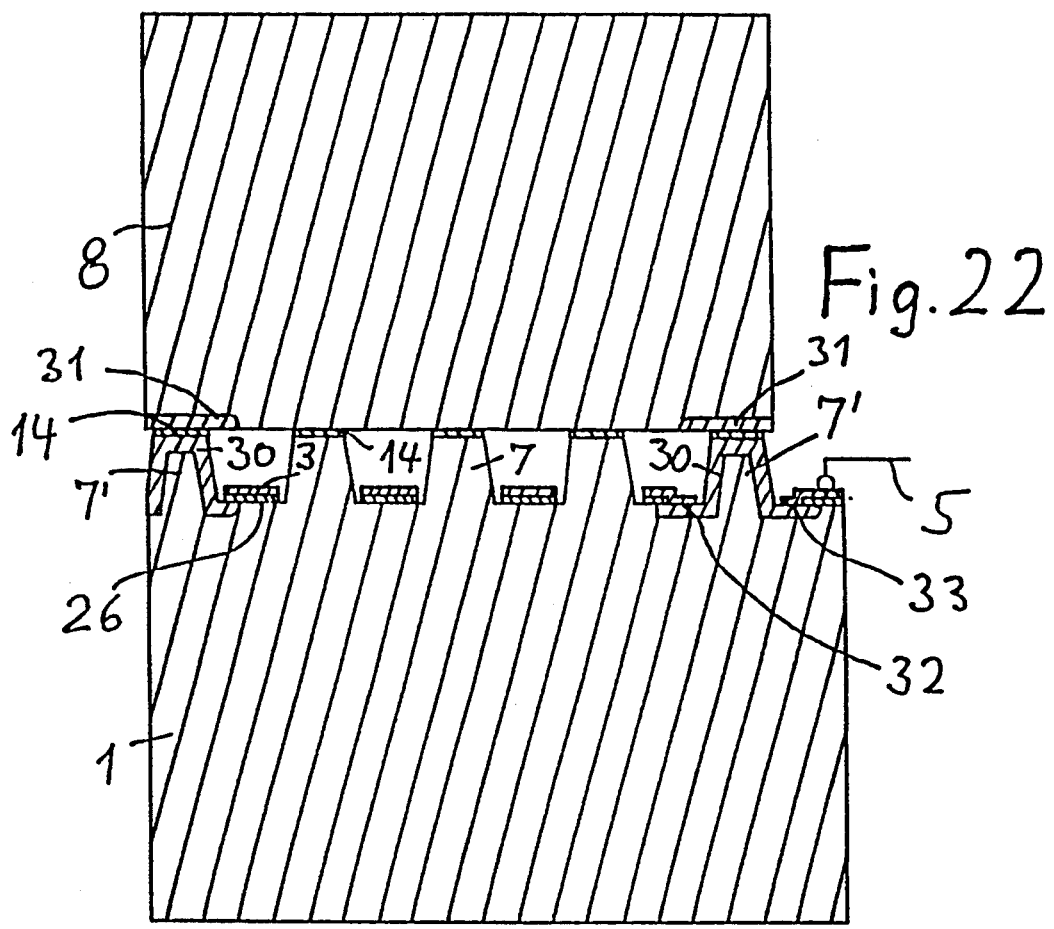
Figure 23:
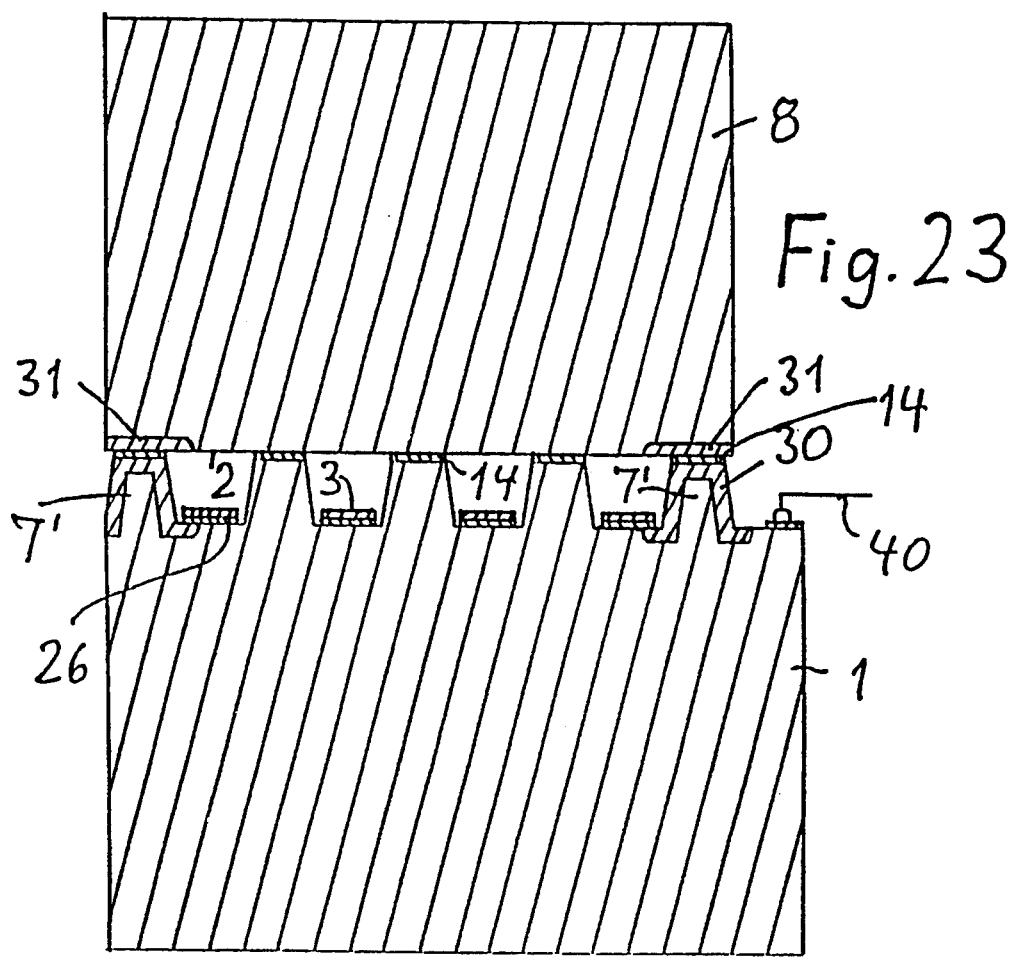
Figure 25:
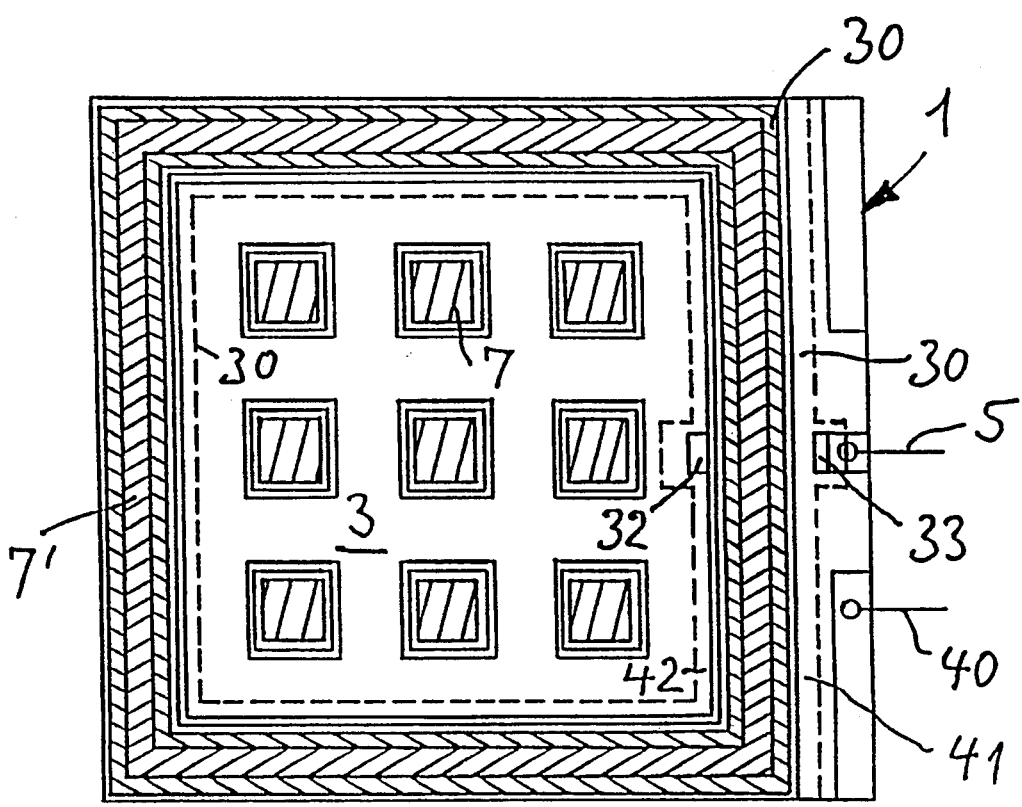

The cover 8 forms one of the two capacitance electrode layers. The base's capacitance electrode layer 3 is attached to and also electrically insulated from the base 1 by the insulating layer 26, which governs the windows 32 and 33. These windows allow contact between the base's capacitance electrode layer 3 and the doped area 30 which, as can be seen in FIGS. 22, 23, and 25, includes the frame-like spacer 7' and the edge strips 41 and 42. With this type of configuration, contact between the sensor's connecting lead 5 and the base's capacitance electrode layer 3 is achieved by way of window 33, the doped area 30, (where a p-n junction electrically insulates area 30 from the silicon material of base 1) and window 32.

Figure 24:
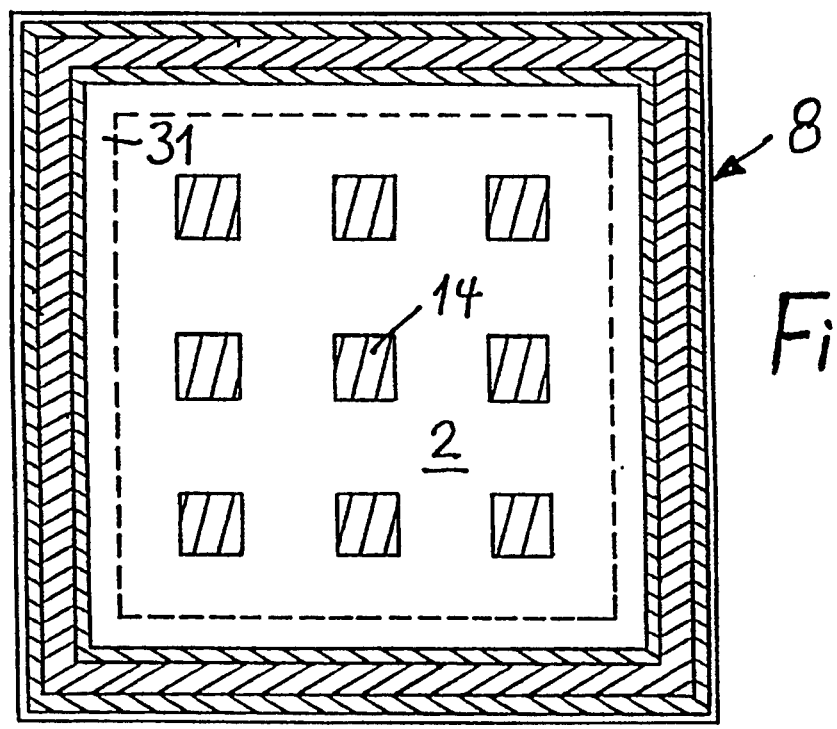

The doped area 31 in the cover 8 can be identified in FIGS. 22 and 24. Viewed in lateral cross section, the doped area 31 is shaped like a square frame that extends over the spacer 7' and into the interior of the force sensor. This ensures that the doped area 30 is electrically insulated from the cover 8 (which serves as a shield) even though the conductive bonding layer 14 joins the base 1 and the cover 8 both electrically and mechanically. The cover 8 and the base 1 are connected via the shield and sensor lead 40. As before, the conductive bonding layer 14 should preferably be composed of one of the previously described eutectic alloys.

The described force sensor has an especially simple design because the contact surfaces of the outer spacer 7' are completely surrounded by doped areas, which form an insulating p-n junction with the silicon foundation material. The doped areas 30 and 31 facilitate the electrical connection between the base's capacitance electrode layer 3, which lies inside the area sealed by the spacer 7', and the sensor's lead 5, which lies outside this area. As already described above, the doped areas 30 and 31 enclose, on both silicon plates, the entire contact surface of the sealing spacer 7' in order to prevent a short circuit between the doped area (capacitance electrode) and the silicon foundation material (shielding electrode) potentially caused by the conductive bonding layer 14. The electrical connection of the silicon foundation material (as a shielding electrode) is accomplished via the spacers 7 located within the interior of the device and the conductive bonding layer 14.

I claim:

1. A capacitive force sensor comprising:
   a base composed of a conductive material and containing a base electrode face, the base electrode face having a base capacitance electrode, the base capacitance electrode being parallel to the base electrode face and secured thereto by an intermediate base dielectric layer;
   a cover composed of a conductive material, containing a cover electrode face disposed parallel to the base electrode face, the cover electrode face having a cover capacitance electrode, the cover capacitance electrode being parallel to the cover electrode face and the base electrode face and secured to the electrode face by an intermediate cover dielectric layer; and
   spacers separating said base from said cover.

2. A capacitive force sensor according to claim 1, wherein the material thickness of the base (1) and cover (8) is greater than the lateral distance between the spacers (7, 7').

3. A capacitive force sensor according to claim 1 or 2, wherein the spacers (7), when square in lateral cross section, are non-deformable columns whose height is approximately the same as the lateral distance between said spacers.

4. A capacitive force sensor according to claim 1 or 2, wherein the spacers (7) are U-shaped ridges that extend along the surface (2) of base (1).

5. A capacitive force sensor according to claim 1 or 2, wherein the spacers (7) are ridges that appear as sections of a circle in cross section.

6. A capacitive force sensor, comprising:
   a base member including a first capacitance electrode on a surface thereof;
   a cover member including a second capacitance electrode on a surface thereof, said cover member being disposed opposite said base member such that the first capacitance electrode and the second capacitance electrode are generally parallel and opposed when not under pressure; and
   spacer means for maintaining an unstressed physical separation of a selected distance between said base member and said cover member and for defining interstices intermediate portions of said spacer means;
   wherein, said base member and said cover member each have a material thickness that is greater than the selected distance, and at least one of said base member and said cover member is formed of a resilient deformable material such that compressive force applied thereto will result in the separation distance in the interstices being less than said selected distance while the first and second electrode are maintained in a relatively parallel orientation to each other, and the first and second electrode are maintained in a relatively parallel orientation to each other, and the first and second electrodes resiliently return to form when the compressive force is removed, such that such separation distance at the interstices returns to said selected distance.

7. The capacitive force sensor of claim 6 wherein said spacer means are a series of nondeformable column members, having a height equal to the selected distance.

8. The capacitive force sensor of claim 7 wherein the spacer columns are have a generally square lateral cross section and have a lateral thickness of approximately the same as the separation distance between a selected column member and the surrounding column members.

9. The capacitive force sensor of claim 6 wherein said spacer means are a series of inverted block U-shaped ridges formed on said base member.

10. The capacitive force sensor of claim 9 wherein each of the inverted block U-shaped members has a height equal to the selected distance and the separation between adjacent ones of the ridges is approximately equal to the lateral thickness thereof.

11. The capacitive force sensor of claim 9 wherein said U-shaped ridges to have a lateral cross-section in the shape of a section of a circle.

12. In a capacitive force sensor having a first capacitance electrode situated on a surface of a base member and a second capacitance electrode formed on an opposing surface of a cover member, the improvement comprising:

providing spacer means intermediate the base member and the cover member, said spacer means having an unstressed thickness of a selected distance, and said spacer means providing interstices intermediate positions thereof, opposing portions of the first capacitance electrode and the second capacitance electrode being exposed within the interstices; and forming at least one of the base member, the cover member and said spacer means to be compressibly deformable and resilient such that the exposed electrodes in the interstices are caused to be separated by less than the selected distance when compressive force is applied to the sensor, while said electrodes maintain a substantially parallel orientation to each other; wherein at least one of the first capacitance electrode and second capacitance electrode is provided with an insulating layer on the opposing surface thereon to prevent shorting on substantial compression.

13. The improvement of claim 12 wherein the compressible ones of the base member, the cover member and said spacer means are resilient such that the separation distance between the capacitance electrodes returns to a value equal to the selected distance when compressive force is removed.

14. The improvement of claim 12 wherein the base member and the cover member are formed of a material having a thickness at least as great as the selected distance.

15. The improvement of claim 12 wherein said spacer means are situated such that the lateral thickness of the spacer means is approximately equal to the width of the interstices.

16. The improvement of claim 12 wherein said spacer means are situated such that the interstices have a width approximately equal to the selected distance.

17. The improvement of claim 12 wherein said spacer means are selected to be noncompressible.

* * * * *